United States Patent [19]

Chou

[11] Patent Number: 4,713,712
[45] Date of Patent: Dec. 15, 1987

[54] CASSETTE TYPE CLEANING DEVICE FOR THE CLEANING OF PLAYING/RECORDING HEAD, ERASING HEAD, AND CAPSTAN/PINCH ROLLER

[76] Inventor: Ta-Chin Chou, 75, Hwa-Sheng Street, Shin-Lin, Taipei, Taiwan

[21] Appl. No.: 869,411

[22] Filed: Jun. 2, 1986

[51] Int. Cl.⁴ .............................................. G11B 5/41
[52] U.S. Cl. .................................................. 360/128
[58] Field of Search ........................................ 360/128

[56] References Cited

U.S. PATENT DOCUMENTS 4,594,629 6/1986 d'Alayer de Costemore d'arc ................................... 360/128

FOREIGN PATENT DOCUMENTS 2839722 3/1980 Fed. Rep. of Germany ...... 360/128

Primary Examiner—Robert S. Tupper
Attorney, Agent, or Firm—Buchnam and Archer

[57] ABSTRACT

A cassette type cleaning device for multi-purpose cleaning of the playing/recording head, erasing head, capstan and pinch roller comprises a universally applicable cotton-tipped cleaning stick held in a tubular retainer which is placed in various types of socket cylinders to meet the requirements of cleaning, namely a first type duo tip retaining socket for cleaning the capstan and pinch roller, an oscillatable second type socket driven through a gear train enpowered from the player/recorders driving spindles for cleaning playing/recording heads, and a third type socket moves with the second type socket through a link connection for cleaning the erasing head.

8 Claims, 11 Drawing Figures

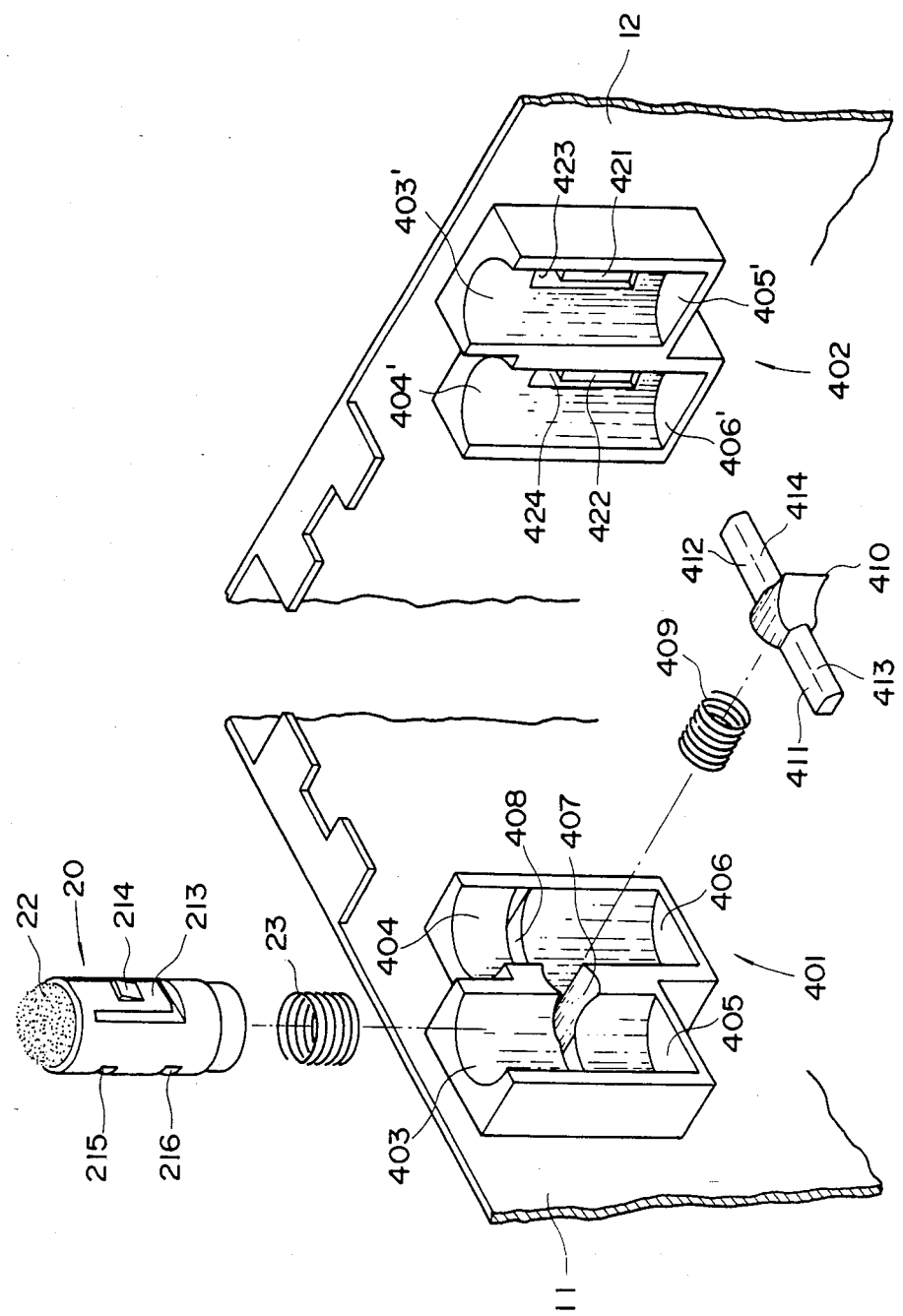

CASSETTE TYPE CLEANING DEVICE FOR THE CLEANING OF PLAYING/RECORDING HEAD, ERASING HEAD, AND CAPSTAN/PINCH ROLLER

The present invention relates generally to cassette type cleaners adapted for cleaning player and/or recording units, and more particularly to a cleaner capable of cleaning the playing/recording head, the erasing head as well as the capstan and pinch roller. The cleaning element is composed of a cleaning head retainer having a replaceable cotton-tip stick inserted therein. The cleaning element can be placed and locked to various types of sockets to meet the different purposes.

The object of the present invention is threefold: the cleaning of (a) the playing/recording head, (b) the capstan and pinch roller, and (c) the erasing head. For this reason, the prior arts is reviewed hereinbelow with reference to the three corresponding objects.

At the outset a so-called "cassette cleaning tape" is employed for cleaning all magnetic heads. In this case a tape with frictional properties is used in lieu of the ordinary magnetic tape in the cassette, to let it run through in contact with the surfaces to be cleaned. Unfortunately, the results with the frictional tape have been poor. Later, pads of felt material have been provided for cleaning, but the ability of solvent absorption is poor and they are not advantageous. The cassette type cleaner currently used does not use cotton.

To clean the playing/recording head of a playing/recording unit, the prior art discloses devices which employ a cassette-like housing having a wiper arm pivotally mounted therein for reciprocating motion. At one end of the wiper arm, there is a cleaning pad which wipes back and forth against the head of the unit. It is desirable that the cleaning pad be held securely to the wiper arm, and yet it is desirable that the cleaning pad be replaced periodically after it has performed a number of cleaning operations. In these known devices, however, the cleaning pad can hardly be held securely enough to the wiper arm, and the close contact of the pad against the surface of the components to be cleaned can hardly be achieved.

In the prior art, for cleaning the capstan and pinch roller of the recording/playing unit, usually a pair of cleaning pads to engage the capstan and pinch roller respectively has been used. These pads may be mounted in a suitable mounting structure. However, similar drawbacks of loose contact and lack of replaceability also exist.

Finally, some cleaning devices have been provided for those "Auto reverse" playing/recording units with separate erasing head. In this case the cleaning device has to face two capstan and two pinch rollers. In addition these pads suffer from the shortcoming of imperfect contact, insecure holding and impossibility of proper replacements.

Therefore, the main object of the present invention is to provide a multipurpose cleaning head assembly which can be applied for cleaning of the playing/recording head, and capstan and pinch roller as well as the erasing head. The cleaning head comprises a matchlike stick with a cotton pad securely adhered thereon, the stick is removable but is tightly inserted in a tubular retainer having tapered inner wall to ensure the tightness of insertion of the stick. One side of the outer wall of the tubular retainer is provided with lock means, for instance, a resilient tongue with a lock member protruding thereon. At the opposite side of the outer wall, upper and lower cuts are formed for a purpose which will be explained later. No matter the purpose for which the cleaning assembly may serve, the tubular tip retainer is a basic construction which may be universally used in cleaning the playing/recording head, the capstan and the pinch roller and the erasing head.

Another object of the present invention is to provide a first type of tip retainer sockets which are built-in side by side in pair and disposed at a position right under the location of the capstan and the pinch roller for the purpose of cleaning the same. These sockets are formed of two longitudinally sliced semi-cylinders, conjugated in a pair of blocks within the cleaning cassette halves. Each socket bottom is provided with a compression spring to bias against the lower end of the inserted retainer so as to cause the cotton tip to press tightly against the surface to be cleaned.

Still another object of the present invention is to provide into one semi-cylinder pair a lateral slot to withhold a spring biased wing shaped lock which serves to selectively catch the upper or lower cut on the tip wall of the retainer to assure a prepared position and to release the lock when the pinch roller to be cleaned is pressed on the cleaning tip, so that during the cleaning period, both capstan and pinch roller can be tightly engaged toward the tips which are now capable of moving freely up and down. Into another semi-cylinder pair, there is provided a longitudinal slot to facilitate the push-in from outside of the socket wall and a pencil tip through the slot to release the protruded lock formed on the resilient tongue of the retainer wall from being caught-up by the upper edge of the longitudinal slot, so that the tip retainer may pop up from the socket under the compression force of the bias spring thereunder for replacement.

Still another object of the present invention is to provide a second type of tip-retainer socket block having a cylindrical inner space with a longitudinal slot for retaining a tip retainer assembly with the protruded lock on the retainer tongue caught by the upper edge of the slot and being releasable with the pushing of a pencil tip through a slot. This structure is almost the same as that of the first type socket, except that the lower stem of the block is extended to form a wiper arm which is pivotally mounted to rocker reciprocally to clean the playing/recording head. The lower end of the wiper arm serves as a follower driven by a pair of complementary eccentric wheels each formed integrally with one of a pair of follower gears meshed with a main pair of driving gears enpowered from the driving spindles of the player/recorder.

A still further object of the present invention is to provide a third type of tip-retainer socket which actually is a brief form of the second type for cleaning an erasing head. The portion below the pivot of the wiper arm of the second type is eliminated, since the arm here is not driven directly through gear trains. However, a connecting means such as a connecting rod is provided between the second type arm and the third type arm, with the aid of a pair of lug ears disposed on the side of each arm. In this manner a parallelogram of linkage is formed to cause the short arm of the third type socket to be able to move in unison with the rockering of the wiper arm of the second type to effect the cleaning of the erasing head.

Other objects and features will become apparent through a detailed description together with the annexed drawing in which:

FIG. 1 is a top elevational view of a cassette type cleaner adapted to utilize the cleaning tip assembly of the present invention for cleaning the playing/recording head of a cassette tape recorder of the "auto reverse" type, as well as cleaning the capstan and pinch roller.

The driving mechanism is also shown;

Figure 3A:
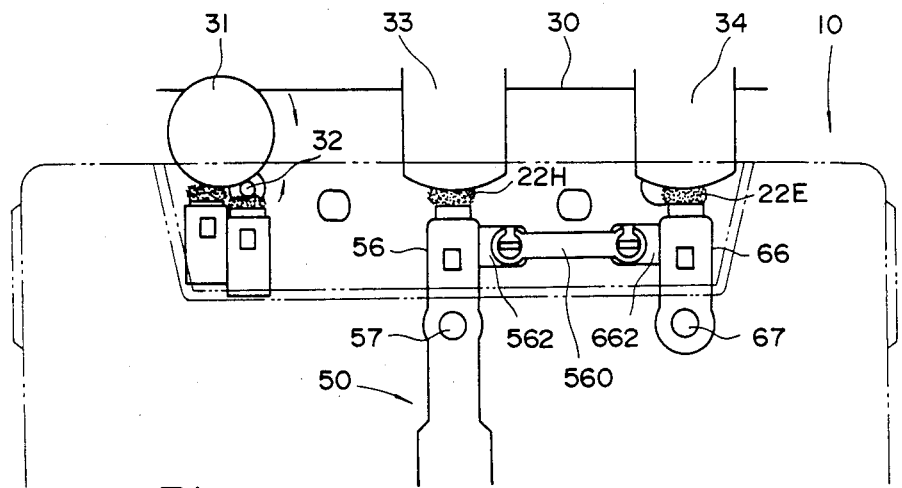
Figure 3B:
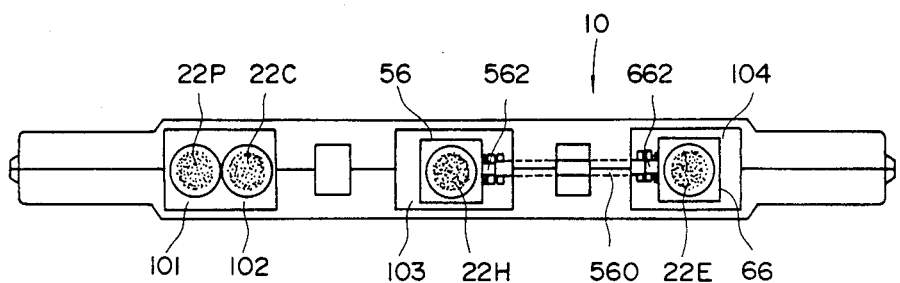
Figure 4A:
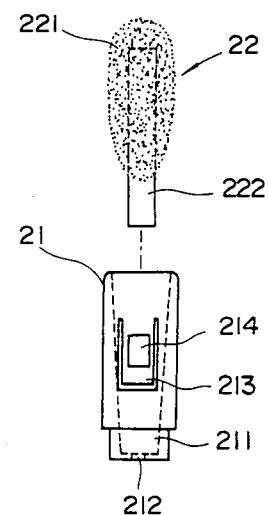
Figure 4B:
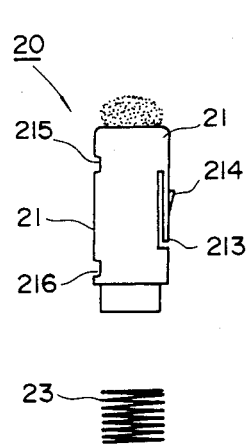
Figure 6:
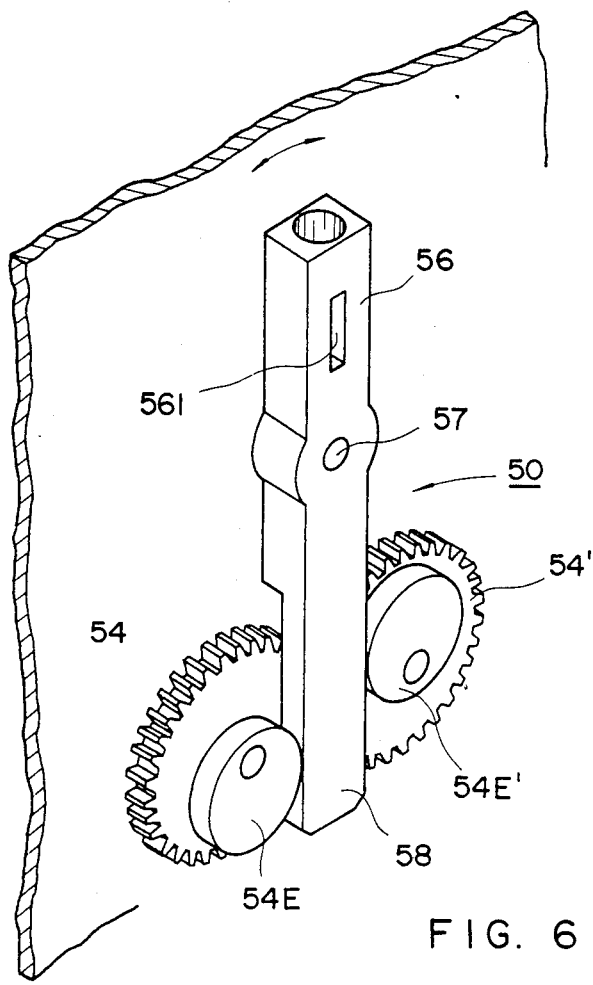
Figure 7:
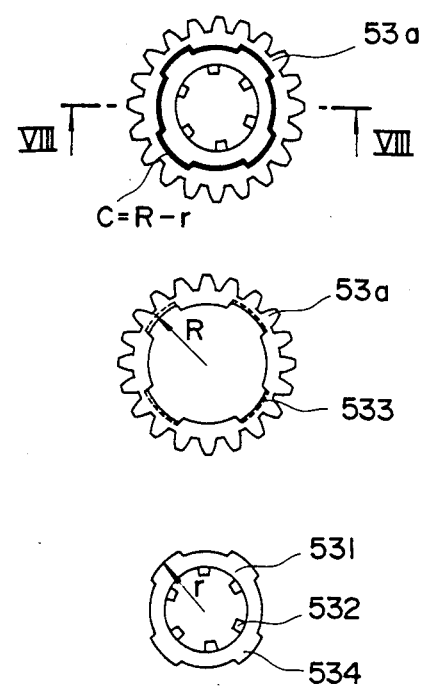
Figure 8:
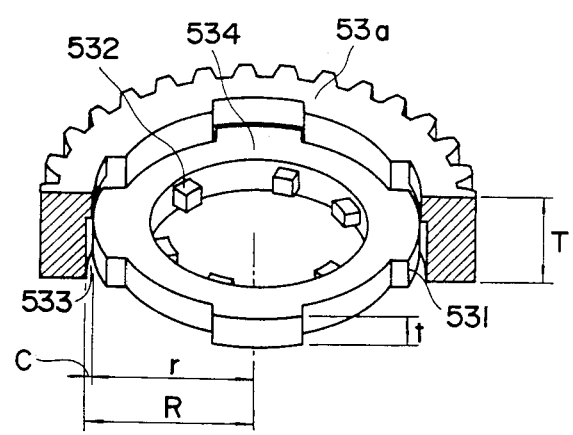

FIG. 3A is a partial top elevational view of a cassette cleaner adapted for cleaning both the playing/recording head as well as the erasing head. The tape recorder here is of the "general type" having separate playing-/recording head and erasing head. The cleaning tips are in close contact with the surfaces to be cleaned and with the connecting links for drive shown;

FIG. 3B is a front view of FIG. 3A;

FIG. 4A is an exploded front view showing the main parts of the cleaning tip assembly including the match stick-like tip and the retainer;

FIG. 4B is a side view of a cleaning tip assembly, showing the cuts and lock tongue;

FIG. 5 is a perspective view showing part of the cassette cleaner in which the relative position of a pair of conjugated semi-cylinder or cylinder halves serves as retaining sockets for the cleaning tip assembly;

FIG. 6 is a perspective view showing the pivotally mounted wiping arm of the playing/recording head cleaner guided by a pair of complementary eccentric drivers;

FIG. 7 is a plan view showing a modification of the driving gear to ensure a better transmission;

FIG. 8 is a sectional view of the gears in FIG. 7 showing the clearance provided to absorb possible vibration of the driving spindle.

Figure 1:
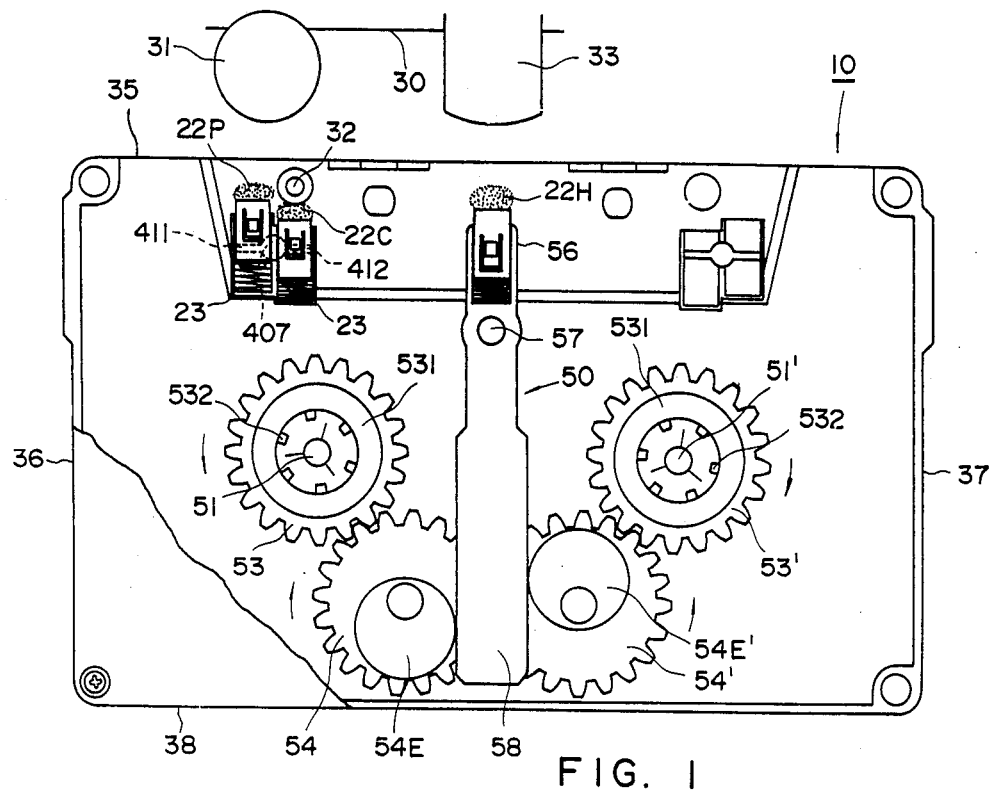

Now referring to FIG. 1, a cassette type cleaner (10) adapted to use the cleaning tip assembly (20) of the present invention is shown for the dual purpose of cleaning the capstan (32), the pinch roller (31) and the playing/recording head (33). However, the cleaning device serves still another purpose for cleaning of the erasing head (34) as shown separately in FIGS. 3A and 3B.

Figure 2A:
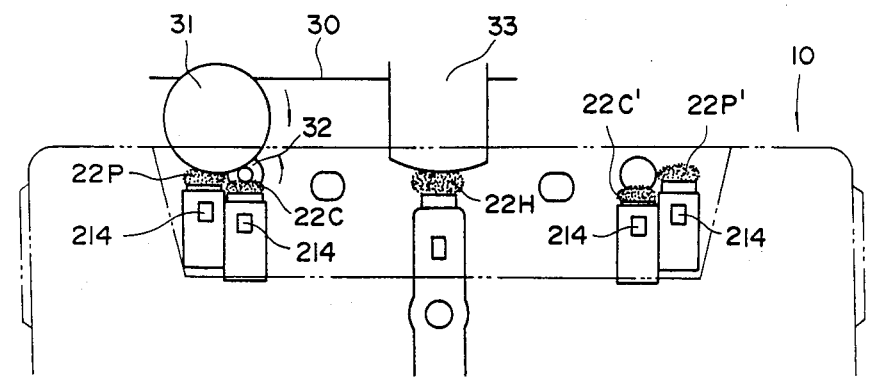
FIG. 2A is a partial top elevational view of the cleaning device shown in FIG. 1, showing the cleaning tips in close engagement to the surfaces of the capstan, the pinch roller and the playing/recording head, the driving means not being shown.
Figure 2B:
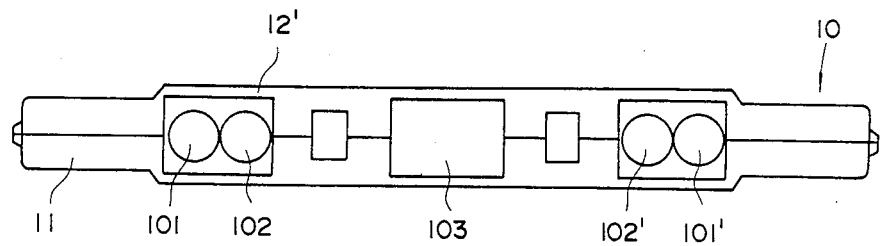
FIG. 2B is a front view of the same.

The playing/recording head, the erasing head, the capstan and the pinch roller are all parts of a conventional "general type" player and/or recording unit, only a portion of which is shown at (30) for ease of illustration. FIGS. 2A-2B show that individual cleaning tip assemblies appear under a corresponding position where accessible openings are provided, namely: cleaning tip assembly (22P-22C) in positions 101-102 for pinch roller (31) and capstan (32), tip assembly (22H) in position 103 for playing/recording head (33); also refer to FIGS. 3A-3B, tip assembly (22E) in position 104 for erasing head (34).

The cassette cleaner comprises a cassette like housing (10) having the general configuration of a conventional cassette housing of a tape cassette. For the purpose of illustration, the top cover of the housing (10) is not shown in FIG. 1. This housing (10) has a front end (35), a rear end (38) and left and right sides (36) and (37) respectively.

No matter the purpose for which the cleaner is being used, the same construction of the cleaning tip assembly (20) such as shown in FIG. 4B constitutes the main part of the present invention. Also refer to FIG. 4A for an exploded view of the tip assembly (20), which comprises a tubular retainer (21) and a tip stick (22) composed of a cotton tip (221) rolled tightly on match-like stick (222). Suitable adhesives may be applied to ensure adherence. The tubular retainer (21) has its inner wall (211) tapered downward to assure a tight grip when the cotton tipped stick is inserted. At the bottom of retainer (21), a small hole (212) is provided to facilitate the insertion of a poking rod to push out the tip stick (22) for replacement. With reference to FIG. 4B for another view of the tubular retainer (21), on one side wall, a lock means is provided, such as the U shape tongue punched out therefrom and protruded lock (214) is formed on the tongue (213). On the opposite side wall, upper and lower cut (215, 216) are formed, which are used as described herein-below.

The basic part of the present invention, the cleaning tip assembly (20) is universally applicable for whatever purpose aforementioned, except that it changes the seat or socket form depending upon the function being performed. Of course, the cross section of the tubular retainer may vary and may be triangular, square, diamond, etc. other than circular shape, and the socket for receiving the retainer must then have the corresponding inner shape.

The first type of seat or socket (40) will be described here by reference to FIGS. 1, 2 or 5. In FIG. 5, the cassette housing (10) is opened to show its bottom (11) and cover (12) respectively. The seat or socket (40) is divided into two halves (401, 402). Each comprises a pair of socket members (403, 404, 403$^1$, 404$^1$) arranged stepwise, when the cassette housing (10) with the bottom (11) and cover (12) closed. The semi-cylinders (403–403$^1$, 404–404$^1$) form a unit to form cylindrical sockets to retain a cleaning tip assembly (20). It should be noted that no matter into which type of seat or socket the tip assembly is to be inserted, a compression spring (23) should always be inserted so that the tip assembly can be biased resiliently against the surface to be cleaned.

In the (401) half of the socket (40), there is a round aperture (407) open at the boundary of the wall joining the semi-cylinder (430, 404) laterally extended into the curvature of the semi-cylindrical wall. A pair of grooves (408) are formed to receive and retain a lock member (410) which has a recess in the center to receive a compression spring (409) to give resiliency to the member (410) so as to be able to have its straight edged wings (411, 412) engaged selectively into the upper or lower cuts (215, 216) or let the tip assembly (20) to slip over along the rounded inclined edges (413, 414) formed on the wing members (411, 412).

In the (402) half of the socket (40), each upper part of the longitudinal slots (421, 422) is cut all the way through the wall of cover (12) so that when the cassette halves (11, 12) are closed, the cylindrical sockets formed by the semi-cylindrical halves (403,403$^1$, 404–404$^1$) take one tip assembly (20). The protruding lock (214) on the tongue (213) of each tip assembly (20) catches the upper edge (423, 424) of the slot (421, 422). The said lock (214) may be released by inserting the tip of a pencil through the slot from outside the cover wall

(12) to push the resilient tongue (213) inwardly. Before the cassette housing (11, 12) is closed, a first tip assembly (20C, 22C) is inserted into the cylinder (404). The assembly (20C) is pushed all the way down until its upper cut (215) is caught by the wing (412) of the lock (410). Another tip assembly (20P, 22P) is then inserted into the cylinder (403) till its lower cut (216) is caught by the wing (411) of the lock (410). When the cleaning cassette is placed in the cassette recess, the tip (22C) is right under the capstan (32), while the pinch roller (31) forces the tip (22P) further down so that the retainer (20P) with its lower cut slips out of catch from the lock wing (411) and forces the lock (410) to retreat into the aperture (407) and the upper cut (215) of the retainer (22C) is also released. In this manner both tips (22P and 22C) are free and are free to move up and down in a neutral position. With the help of springs (23) retained in the bottoms of cylinder (405, 406), the tips (22P, 22C) are thereby biased against the pinch roller (31) and capstan (32) tightly to ensure a thorough cleaning.

FIGS. 1 and 6 illustrate a second type of retaining socket (56) for tip (22H) which serves for cleaning the playing/recording head (33). The second type socket (56) is also in a block shape and has a cylindrical inner space for receiving and retaining a tip (22H). Alongside block (56), a longitudinal slot (561) is provided for inserting the tip of pencil to release the tongue lock on the retainer wall. The block (56) extends to the other end to form a rocker arm (50) which is pivotally mounted in the center of the housing (10) by a pin (57). The lower end (58) of the arm (50) is cut to one-half of its thickness to be guided by a pair of complementary eccentric members (54E–54E$^1$) which are formed integrally with a pair of driven gears (54–54$^1$) meshed behind the lower end (58). Gears (54–54$^1$) are in turn driven by a pair of driving gears (53–53$^1$) enpowered from the driving pair of spindles (51–51$^1$) of the player/recorder. The oscillation of the arm (50) caused by revolving the complementary pair of eccentric members (54E–54E$^1$), causes the cleaning tip (22H) to swing under the playing-/recording head (33). The disposition of the eccentric pairs is complementary to each other, so that they can guide the arm (50) in a push-pull manner.

A third type of tip-retainer socket (66) as shown in FIGS. 3A and 3B is actually a brief form of the second type one (56). A pivot pin (67) is provided for rockerably mounting the socket (66), and positioned for cleaning an erasing head (34). The portion below the pivot (57) of the wiper arm of the second type is eliminated, since the arm here is not driven directly through gear trains. However, connecting means such as a connecting rod (560) is provided between the second type socket arm (56) and the third type socket arm (66), with the aid of a pair of lug ears (562–662) disposed at the side of each arm in a face to face manner. Thereby a parallelogram of linkage is formed with arm (56), lug (562), connecting rod (560), lug (662), arm (66), and pivots (57–67). The short arm (66) is caused to oscillate in unison with the rockering of wiper arm (50) to effect the cleaning of the erasing head (34). The connecting rod (560) may comprise at each end a clip to join the respective lug ear as shown.

In case the erasing head (34) is not separately provided as shown in FIGS. 3A and 3B, the player/recorder is of double capstan/pinch roller construction, in other words, the recorder unit is of the "auto reverse" type and another pair of cleaning tips (22C$^1$–22P$^1$) may be provided in position 101$^1$–102$^1$ (FIG. 2B).

FIG. 7 shows a modification of the driving gear (53) which is breaking into a gear ring (53a) for engaging with the driven gear (54) to which the eccentric guide (54E) is integrally formed; an additional crossgear (531) having crossly arranged teeth (534) to engage with the inner cross recess (533) of the gear (53a). The cross gear (531) is in turn driven by the driving spindles of the player/recorder. This modification in the driving means would give an improvement in the transmission, where possible vibration through improper or loosely meshed gearing may be eliminated to give amuch smoother performance.

The thickness t of the cross gear (531) is made about one-third of the thickness T of the gear (53a) having the inner cross recess (533). The radius of the inner cross recess of the gear (53a) is designated as R, while the outside radius of the cross gear (531) is r, where $R > r$ and $R - r = C$. C is defined as a clearance between gears (531 and 53a). Such an arrangement enhances the vibration absorbing capacity of gear (531) due to the buffering function of the clearance C. Thus the gear (53a) can rotate properly and mesh steadily on the follower gears to be driven. This relationship can be clearly seen through the illustration of FIG. 8.

What is claimed is:

1. A cassette type cleaning device for cleaning the playing/recording head, the erasing head, and the capstan/pinch roller, comprising a housing, socket means for engaging said capstan, said pinch roller, said playing/recording head, and said erasing head, each of said socket means having lock means, cleaning tip assemblies within the housing, each of said assemblies including: a cotton tipped match-like stick, a tubular retainer having an outer wall, said cotton tipped, match-like stick being securely inserted into the inner space of said tubular retainer; the inner wall of the retainer being downwardly tapered so as to tightly hold said stick match therein, said retainer having an orifice at the bottom to facilitate removal of the cotton tipped stick, a resilient U-shaped tongue with protruding member on one side of the outer wall of the retainer, an upper and a lower cut on the opposite side of said outer wall, for engagement with said lock means of said socket means.

2. The device according to claim 1 wherein said socket means is a socket having a cylindrical inner spece for receiving and retaining one tip assembly, and a longitudinal slot having an upper edge for engagement with said tongue of said retainer wall.

3. The device according to claim 1 cleaning the capstan and the pinch roller, wherein the socket means comprises a pair of cylinders arranged stepwise, said cylinders being cut longitudinally into two pairs of semi-cylindrical halves, said housing has a bottom and a cover, said semi-cylindrical halves being disposed on said bottom and said cover, said semi-cylindrical halves being matchable when the housing is closed up to form a pair of cylindrical sockets for receiving and retaining a pair of cleaning tip assemblies for cleaning respectively the capstan and pinch roller, and biasing means for resiliently biasing said top assemblies against said capstan and said pinch roller.

4. The device according to claim 3, wherein one pair of said semi-cylindrical halves has a lateral slot with a central aperture, and said socket means includes a spring-biased lock member for catching one of said tip assemblies on said upper or lower cut on the outer tubular retainer wall, said spring biased lock member urges on the surface of said capstan and said pinch roller.

5. The device according to claim 1 wherein said lock member has a pair of wings for engagement with said upper and lower cut.

6. The device according to claim 1 for cleaning the playing/recording head, wherein said socket means is a socket (56) pivotally mounted in the center of the housing, said socket comprises an oscillating arm (50), said arm having a lower end (58), said socket comprises a pair of complementary eccentric members (54E, 54E') formed integrally with a pair of driven gears, said socket comprises a pair of main gears for driving said driven gears, said playing/recording head has spindles, said spindles driving said main gears.

7. The device according to claim 6, wherein said main driving gear comprises a gear ring (53a), a cross-gear (531) and an inner gear (534) having teeth and wherein a clearance is provided between said cross-gear and said gear ring.

8. The device according to claim 1 for cleaning said playing/recording head and said erasing head, which comprises a socket (56) pivotally mounted in the center of said housing, said socket comprises an oscillating arm (50), said arm having a lower end (58), said socket comprises a pair of complementary eccentric members (54E, 54E') formed integrally with a pair of driver gears, said socket comprises a pair of main gears for driving said gears, said playing/recording head has spindles, said spindles driving said main gears, said device comprising a second socket (66), said second socket has lug ears and a second arm, a connecting rod connects said oscillating arm (50) to said second arm whereby a linkage parallelogram is formed between said oscillating arm (50), said lug ears and said second arm, said second arm oscillating in unison with said oscillating arm (50).

* * * * *